United States Patent [19]

Koelle et al.

[11] 4,264,862

[45] Apr. 28, 1981

[54] INDUCTION LOGGING DEVICE WITH A PAIR OF MUTUALLY PERPENDICULAR BUCKING COILS

[75] Inventors: Alfred R. Koelle; Jeremy A. Landt, both of Los Alamos, N. Mex.

[73] Assignee: The United States of America as represented by the United States Department of Energy, Washington, D.C.

[21] Appl. No.: 67,856

[22] Filed: Aug. 20, 1979

[51] Int. Cl.³ .............................................. G01V 3/28
[52] U.S. Cl. ..................................... 324/339; 324/343
[58] Field of Search ............... 324/330, 334, 339, 340, 324/343, 346

[56] References Cited

U.S. PATENT DOCUMENTS

| | | | |
|---|---|---|---|
| 2,359,894 | 10/1944 | Brown et al. . | |
| 2,582,315 | 1/1952 | Doll | 324/339 |
| 2,931,973 | 4/1960 | Puranen | 324/330 X |
| 2,964,698 | 12/1960 | Lehmberg | 324/339 |
| 3,065,407 | 11/1962 | Huddleston et al. | 324/339 |
| 3,187,252 | 1/1965 | Hungerford | 324/343 |
| 3,487,294 | 12/1969 | Youmans et al. . | |

*Primary Examiner*—Gerard R. Strecker
*Attorney, Agent, or Firm*—Jerome B. Rockwood; Paul D. Gaetjens; James E. Denny

[57] ABSTRACT

An instrument is disclosed for mapping vertical conductive fractures in a resistive bedrock, magnetically inducing eddy currents by a pair of vertically oriented, mutually perpendicular, coplanar coils. The eddy currents drive magnetic fields which are picked up by a second, similar pair of coils.

10 Claims, 4 Drawing Figures

INDUCTION LOGGING DEVICE WITH A PAIR OF MUTUALLY PERPENDICULAR BUCKING COILS

BACKGROUND OF THE INVENTION

1. Field of the Invention

The present invention relates to a logging device for detecting and mapping vertical conductive fractures in areas of the earth surrounding a bore hole.

Techniques are being investigated for extracting energy from hot dry rock. The present approach is to drill a hole into a hot solid rock formation, hydrualically fracture the rock, determine the fracture orientation, intersect the fracture with a second drill hole, and circulate a working fluid, such as water, between the two drill holes through the vertical fractures to extract thermal energy. At present there is no proven method of mapping vertical fractures from a single borehole to enable directional drilling of the second hole with sufficient accuracy to intersect the fracture. The present invention comprises an instrument capable of mapping vertical conductive fractures in an electrically resistive bedrock. The fracture is mapped using magnetically induced eddy currents in the water filled fracture, employing an instrument somewhat similar to the induction sondes conventionally employed by the oil industry.

2. Description of Prior Art

In the present dry hot rock energy extraction techniques, difficulty has been encountered in establishing a low impedance liquid connection between the two bore holes. The fractures connecting the two bore holes appear to be roughly circular vertical discs of several hundred meters in diameter and several millimeters wide. These fractures are at a depth of about 3000 meters. The water circulating between the two bore holes reaches a temperature of 275° C. at a pressure of 10,000 psi. This water has a resistivity of approximately 10 ohm-m at 250° C. If the fracture width is 3 millimeters, the fracture corresponds to an equivalent sheet resistivity of 3000 ohm per square. Resistivity of the surrounding rock is considerably greater than 3000 ohm-m. While the petroleum industry employs several techniques to attempt to map fracture systems, these generally do not lend themselves to the type of fracture system that is to be measured in connection with hot dry rock geothermal systems.

The present invention enables fracture mapping employing a single bore hole and at any depth. Alternating magnetic fields are set up around a conducting medium in the fracture that generate eddy currents therein. These eddy currents in turn generate magnetic fields that are sensed by a receiver, enabling mapping into the rock formation.

The vertical conductive fracture detector senses eddy currents induced in the fluid in the fracture by a transmitting coil contained in the instrument. The eddy currents can be detected by measuring their magnetic field with a receiving coil. The fracture orientation is found by rotating the coils and finding the angle $\beta$ for which the signal is maximum. This mapping involves several elements. The orientation of the instrument case must be determined by means of a reference. The coils are rotated to determine the greatest received signal. This rotation can be accomplished electronically, involving no mechanical motion, if two identical coil sets orientated at right angles to each other are used. The coils are located in a nonconductive housing. However, the conductive bore hole fluid must be displaced in the vicinity of the coils.

OBJECTS OF THE INVENTION

It is an object of the present invention to provide apparatus for determining the direction of material fractures adjacent to a borehole.

Another object of the present invention is to transmitt a radio frequency signal into rock strata adjacent a borehole, and to directionally receive signals indicating vertical fractures.

Other objects, advantages and novel features of the invention will be apparent to those of ordinary skill in the art upon examination of the following detailed description of a preferred embodiment of the invention and the accompanying drawings.

SUMMARY OF THE INVENTION

Briefly, the invention concerns deep well induction logging apparatus. The apparatus comprises a pair of transmitting coils mutually perpendicular to one another, a pair of receiver coils also mutually perpendicular to one another, and a pair of bucking coils placed between the transmit coils and the receiver coils. Each of the pairs of coils are coplanar with one another, and have a common polar axis. The fields of the coils are rotated electronically, requiring no actual mechanical rotation. A commercial flux gate magnetometer provides a local reference direction employing the earth's magnetic field. The coils are enclosed within a bladder which may be inflated, displacing the conductive fluid and protecting the coils.

DETAILED DESCRIPTION

Figure 1:
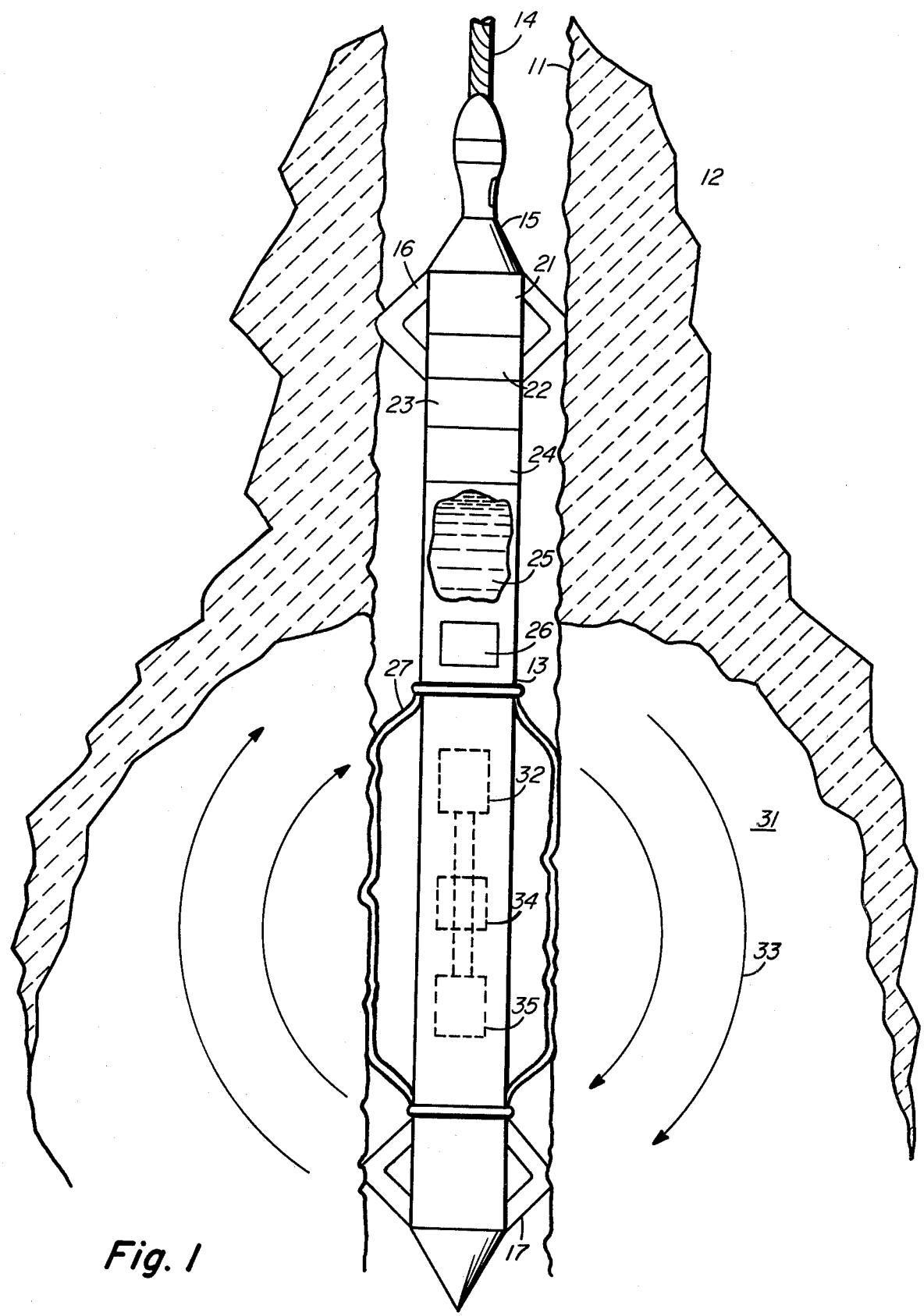
FIG. 1 illustrates schematically the down hole instrument of the present invention for mapping vertical conductor fractures.

Referring now to the drawings, and in particular to FIG. 1, there is shown, somewhat schematically, an induction logging system constructed to map the vertical conductive fractures which are particularly useful for extracting geothermal energy from hot dry rock formations. A well 11 is drilled into a high temperature rock formation 12. A tool 13 is lowered down the well bore into the formation by means of cable 14 and cablehead 15. Upper centralizer 16 and lower centralizer 17 center the tool in the well bore. Within the tool is a receiver compartment 21, a transmitter compartment 22, a compartment containing signal conditioning apparatus 23, and a flux gate magnetometer for orientation, 24. An oil reservoir 25 and an oil pump 26 are provided to inflate bladder 27 with oil.

A vertical fracture illustrated schematically at 31 is filled with conductive fluid such as water through well bore 11. A pair of mutually perpendicular transmitting coils 32 having a common vertical axis, induce currents illustrated by the circular arrows 33, in the thin, fluid-filled, fracture. A pair of mutually perpendicular bucking coils 34, parallel to, and having a common polar axis with transmitting coils 32, are provided to prevent transformer action between the transmitting coils and the receiving coils, as further disclosed hereinbelow. The mutually perpendicular receiving coils 35 are also centered on the common vertical axis of the transmitting coils and bucking coils, and are coplanar with the transmitting coils 32 and bucking coils 34.

While electronic rotation can be accomplished by sinusoidally time-varying the magnitude of the current in each transmitter coil and then appropriately combining the signal measured by the receiving coils, it requires a great deal of accuracy and stability. At present, it is preferred to drive the transmitter coil number 1 and measure signals in both of the receiving coils, then to repeat the procedure for transmitting coil number 2.

While constant speed physical rotation of a set of transmitting, bucking, and receiving coils can be simulated by modulating the drive amplitude of a perpendicular pair of transmitting coils with a sine and cosine function of the rotation rate and combining the outputs of a pair of coplanar perpendicular receiving coils after similar sine and cosine weighting, this requires a high degree of accuracy and stability and complex circuitry. A preferred method, which gives the same information with much similar circuitry, is to drive each of the two perpendicular transmitting coils, one at a time and with a constant drive level, reading the output of each of the two perpendicular receiver coils when each transmitting coil is activated, for a total of four separate readings. Impedances are defined according to the equations $$Z_{11} = V_{r1}/I_{t1} \quad (1)$$

$$Z_{21} = V_{r2}/I_{t1} \quad (2)$$

Then a current is excited in transmitter coil 2 and forms the impedances $$Z_{12} = V_{r1}/I_{t2} \quad (3)$$

$$Z_{22} = V_{r2}/I_{t2} \quad (4)$$

These impedances may be calculated once the measurements are made by equipment, at the surface, thus eliminating an electronic divider downhole. Since the system is linear, $Z_{12} = Z_{21}$, and this can be used for a diagnosis of electronic performance. The impedances of equations 1-4 contain the information required to synthesize a mechanical rotation. This is done by combining them according to the equation defined voltage at an angle $\beta$ $$V_r(\beta) = [Z_{11} \cos \beta - Z_{12} \sin \beta) \cos \beta - (Z_{21} \cos \beta - Z_{22} \sin \beta) \sin \beta] I_o \quad (5)$$

where $\beta$ is measured from the plane of coils labeled number 1.

Consider a single conductive fracture in a background conductive medium. For each transmitting coil, the fields can be broken into components parallel to and perpendicular to the fracture. Considering these separately and using superposition, it can be shown that if the coil sets are identical in construction and location except for a 90° rotation, the impedances are $$Z_{11} = Z_R + Z_F \cos^2 \alpha \quad (6)$$

$$Z_{12} = -Z_F \sin \alpha \cos \alpha \quad (7)$$

$$Z_{21} = -Z_F \cos \alpha \sin \alpha \quad (8)$$

$$Z_{22} = Z_R + Z_F \sin^2 \alpha \quad (9)$$

where $$Z_F = V_F/I_o \quad (10)$$

$$Z_R = V_R/I_o . \quad (11)$$

$\alpha$ is the angle between the fracture and the coils labeled 1, $I_o$ is defined where $I = I_o \cos\beta$ and it may be proved that if only the direction of the fracture is desired, it can be found from $$\alpha = \tfrac{1}{2} \tan^{-1} \frac{Z_{12} + Z_{21}}{Z_{11} - Z_{22}} \quad (12)$$

Note that the sign of $Z_{12}$ and $Z_{21}$ contain the information about the quadrant of $\alpha$.

The equations above point to the need for extreme care in construction to eliminate spurious signals. Crosstalk between a transmitter coil and the receiver coil which is perpendicular thereto is especially critical. This crosstalk will limit the sensitivity of the instrument.

A large transformer signal is measured with two sets of coils. This unwanted signal is 90° out of phase from the desired signal. In theory, a phase-sensitive detector could discriminate against this unwanted signal. However, this transformer signal is usually much larger than the desired signal. The transformer signal can be reduced by a technique commonly called bucking.

In some cases, it is practical to effect the bucking electronically. In the present invention, however, a three coil system is employed. The three coils are the transmitting coil 32, the bucking 34, and the receiving coil 35. If the current in the transmitting coil $I_t$ is equal to the current in the bucking coil $I_b$, then the receive signal for a homogeneous medium is $$V_r = j \frac{\omega \mu N_R S_R I_T}{4\pi} \left\{ \left[ \frac{N_T S_T}{R_T^3} - \frac{N_B S_B}{R_B^3} \right] + j \frac{\delta \mu \sigma}{2} \left[ \frac{N_T S_T}{R_T} - \frac{N_B S_B}{R_B} \right] \right\} \quad (13)$$

Because the transformer signal varies as $1/R^3$ and the eddy current signal varies as $1/R$, it is possible to cancel the transformer signal by choosing $$\frac{N_T S_T}{R_T^3} = \frac{N_B S_B}{R_B^3} \quad (14)$$

$I_T$ is the current in the transmitting coil, $I_B$ is the current in the bucking coil, $R_T$ is the distance between the receiving coil and the transmitting coil and $R_B$ is the distance between the receiving coil and the bucking coil. It is thus possible to cancel the transformer signal and not have the eddy current canceled as well. Several advantages are apparent for this mechanically arranged bucking. If thermal expansion occurs, the bucking is not affected since it depends on ratios of distances. These ratios will not be affected if the thermal expansion is uniform. The placement of the bucking coil is not extremely critical. A reduction in transformer coupled signal of over 1000 times is relatively easy to achieve and maintain.

It is also required that the instrument be concentric with the bore hole. The received signal varies approximately as the volume of the conductive material supporting the eddy currents and roughly as the inverse cube of distance from the coils. Therefore the bore hole signal will be at least ten times as large as the desired signal. If the instrument is not centered in the bore hole or if the bore hole in non-circular, the resulting asymmetries will swamp out the desired signal originating in the fracture. Consequently, it is necessary that the bore hole signal be eliminated by displacing the conductive bore hole fluid. While small pockets of fluid in the bore hole will not be detected since the eddy current paths are too small, larger voids must contain less conductive material then is contained in the fracture within roughly ½ meter from the bore hole. The conductive fluid therefore should be displaced, leaving an annulus of no more than about 1 millimeter thickness of fluid. Displacement of conductive fluid from the bore hole is enabled by inflating bladder 27 with a nonconductive material, such as oil.

Figure 2:
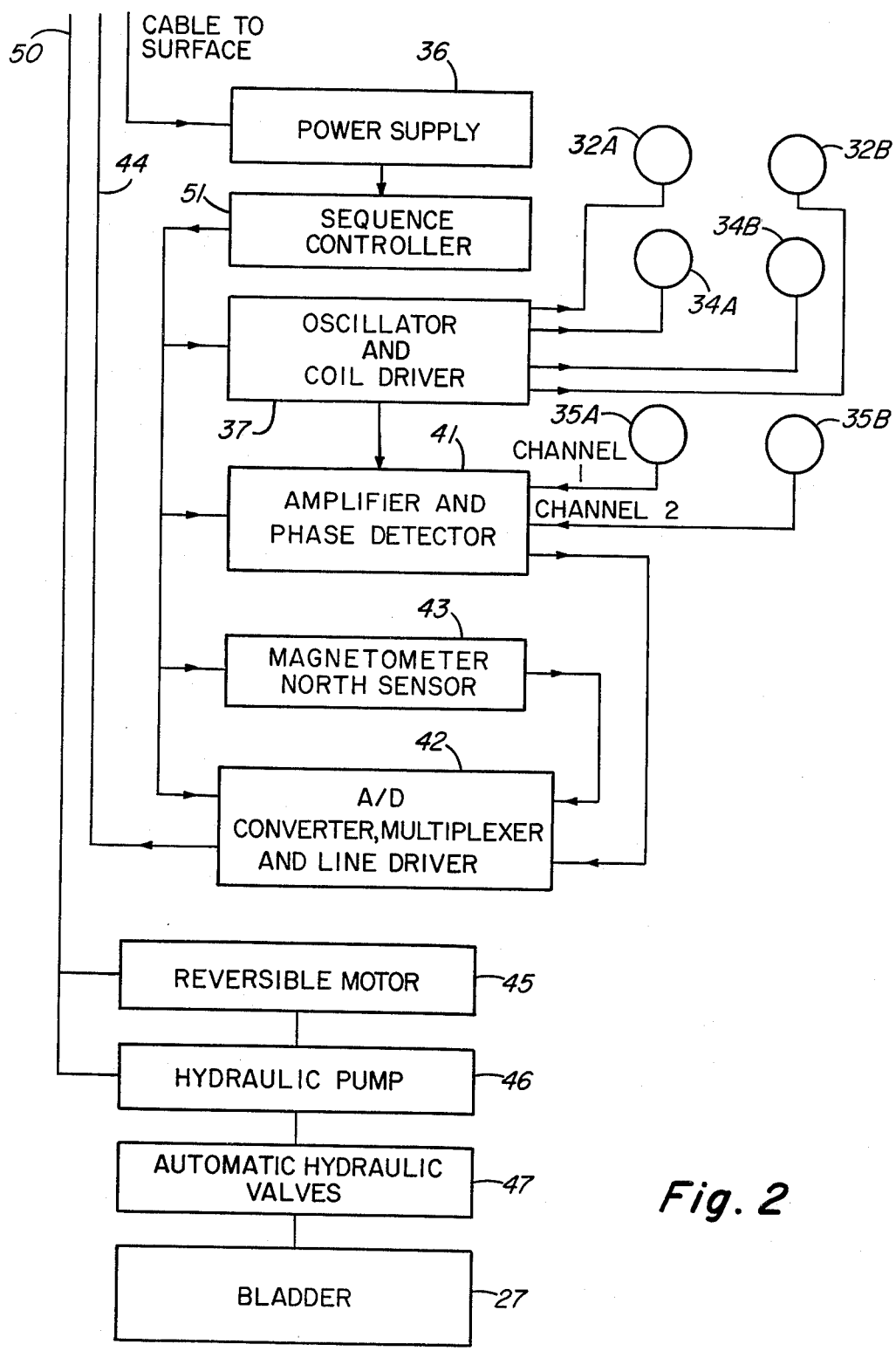
FIG. 2 is a block diagram illustrating the electronics of the present invention.

The block diagram of the logging device of the present invention is illustrated in FIG. 2. A conventional power supply 36 supplies operating currents to the electronics of the present invention. An oscillator and coil driver 37 provides a 100 kHz current to transmit coils 32A and 32B in the proper phase and sequence. Oscillator and coil driver 37 also feeds the bucking coils 34A and 34B. Receive coils 35A and 35B are connected to an amplifier and phase detector 41. The output of amplifier and phase detector 41 is connected to an analog to digital converter, multiplexer and line driver 42. In addition, a magnetometer north sensor 43 is connected to analog to digital converter, multiplexer and line driver 42. The output data from analog to digital converter 42 is transmitted to the surface on an output cable 44.

Figure 3:
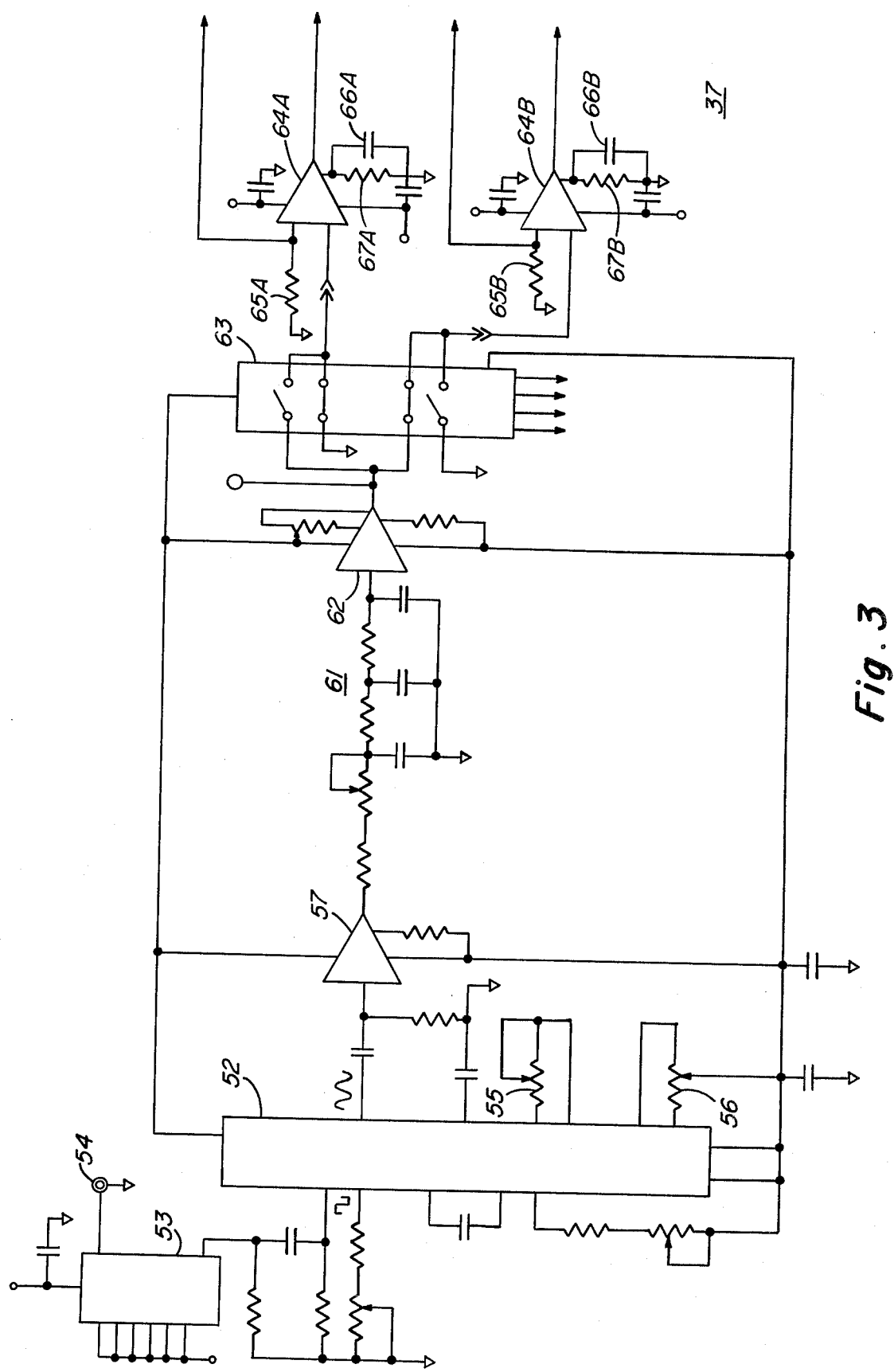
FIG. 3 is a schematic diagram illustrating the electronic circuits employed in the oscillator and coil driver of FIG. 2.

A reversible motor 45, controlled from the surface, drives hydraulic pump 46. The hydraulic pump 46, through suitable valves 47, inflates the bladder 27 at the desired time. A sequence controller 51 is provided to control the necessary steps required for procuring a measurement. Oscillator and coil driver 37 is illustrated schematically in FIG. 3. The 100 kHz working frequency is generated by a conventional integrated circuit RC oscillator 52. In this device, a timing capacitor is charged and discharged with constant current sources between two voltage limits sensed by a pair of internal voltage operators. This process generates a triangular wave and a square wave. The square wave is taken out of the circuit 52 and applied to buffer amplifier 53. A phase reference signal is then available at terminal 54 for employment with the phase sensitive detector in the receiver. The triangular wave is converted into an approximation of a sine wave by a shaping circuit within the integrated circuit 52. The sine wave shape is optimized by a shape adjust potentiometer 55 and a symmetry adjusting potentiometer 56. The sine wave output is passed through a voltage follower 57, which serves as a buffer. The sine wave is then phase shifted by 90° in a three section RC phase shifter 61, which also acts as a low pass filter to remove residual harmonic distortion in the sine wave signal. The 90° phase shift is necessary since the phase sensitive detector requires that the square wave phase reference signal be in phase with the sine wave phase component to be measured, and the oscillator 52 produces a square wave and sine wave output in phase quadrature. Since there is no practical way to phase shift a square wave, it is necessary to phase shift the sine wave. The phase shifted sine wave is applied to buffer amplifier 62 and from there to a quad analog switch 63. Two sections of the quad analog switch 63 are used with each coil driver to either pass through the sine wave signal or to ground the input. The switch control inputs come from sequencing circuitry, to be disclosed herein below.

Coil drivers 64A and 64B are wide band operational amplifiers operated in a voltage to current converter mode. The current sent to the transmitting coils is returned to the driver circuit through the return wire of a twisted pair transmission line and is passed to circuit common through resistors 65A and 65B at the amplifier input. The amplifier action forces voltage balance between the sine wave voltage input from switch 63 and the voltage produced by the current through the current sampling resistors 65A and 65B. Sufficient voltage gain is provided at 100 kHz to enable this conversion with negligible phase shift and distortion.

The transmitting coil inductance, 68A and 68B, which is several millihenries, is series resonated at 100 kHz with a suitable capacitor to cancel the inductive reactance seen by the coil driver. The series resonant connection makes it possible to drive the coil with 10 mA at 100 kHz with only a few volts of the output of the amplifier to drive the current through the coil resistance, the sampling resistor, and any residual unbalanced reactance. The resonating capacitors 66A and 68B are shunted by resistors 67A and 67B to provide a dc path for the feedback sufficient to keep the dc level at the amplifier output at 0.

Amplifier and phase detector 41 enable control of phase relationships at the 100 kHz working frequency, since the major means for separating the eddy current response from the signal directly coupled by transformer action between the sending and receiving coils is due to the fact that they are in phase quadrature. Most of the direct coupled signal is balanced by means of the cancellation coils so that it will not overload the amplifier, but there will be a residual quadrature phase signal remaining because of the limitation on cancellation that can be achieved and maintained. The phase sensitive detector is used to reject the residual quadrature signal. The phase sensitive detector also functions as a means for reducing the noise band width of the amplifier by means of a low pass filter placed after the detector. Such a reduction in the effective band width of the receiver amplifier is necessary to allow detection of the eddy current signals, which are in the tens of nanovolts range. Employment of the phase sensitive detector and a post detector filter to reduce the band width, allows the main 100 kHz amplifier to be operated with a broad response centered about 100 kHz, and therefore, with only a gradual change in phase shift with frequency.

The two sets of coil signals are individually amplified in a low noise, well balanced differential input stage, with a constant current emitter current source for common mode rejection, and a cascode output for low phase shift. Signal passage through these two input stages is controlled by turning the constant current sources on or off by the sequence controller 51.

Ground reference for the coil signals is obtained by grounding the center taps of the coils to the shielded common at the coils. No other ground is connected to the signal lines, thereby avoiding ground loop coupled noise problems. Employing a constant current source for the emitter current and the inherently well balanced transistor pair results in high rejection of common mode noise on the input signals.

The first stage outputs are further amplified in another differential transistor pair with cascode outputs for low phase shift, and then taken off single-ended with local ground reference to the main amplifier stages. Close control over amplifier gain is not necessary, since the measurements made depend on the ratio of the outputs in the four measurement configurations, to be disclosed further hereinbelow, rather than on the absolute level. Following the first input stage, the amplifier channel is common to all the measurement modes. The main AC amplification is done in three feedback stages applying conventional wide band operational amplifiers. The bandwidth of the amplifier is determined by the interstage coupling networks, which are set to produce both a low frequency and a high frequency corner at 100 kHz, each with a 45° phase shift in opposite directions for net 0 phase shift. The net frequency response characteristic is a rather broad response centered at 100 kHz, with 3 db frequencies at 55 kHz and 190 kHz, rolling off at about 12 db per octave at the skirts. While such a broad response is undesirable from the noise viewpoint, it ensures that the phase shift is not sensitive to small changes in the coupling components.

The phase sensitive detector passes through either the positive or the negative half of an in-phase 100 kHz sine wave signal, and the dc level of the output is approximately 0.9 of the rms ac signal level. It was found that a half wave detector is sufficient and much simpler than a full wave detector. The phase detector input is directly coupled to the last ac amplifier stage output and passes through any dc component in this signal. The last ac amplifier stage is provided with a dc offset control to zero the dc level in its output.

The dynamic range of the phase detector goes from approximately a millivolt to several volts. Much of the dynamic range is employed to accommodate the amplitude of the quadrature phase signal, which may be several times as large as the inphase component of interest. The dc output due to the quadrature phase signal will be 0, leaving only the output due to the inphase signal component. A lowpass filter is employed following the phase sensitive detector.

To produce synthetic electronic coil rotation, two identical coil sets are employed. Each set consists of three separate coils and the planes of the coil sets must be oriented 90° from one another. Further, the center of each coil must coincide with the center of its perpendicular twin. The coils have metal Faraday shields around them except for a gap. The purpose of the shield is to eliminate the large unwanted capacitive coupling signals that would be present otherwise.

The vertical induction log of the present invention requires a means of determining the azimuth of the tool when it is downhole. A flux gate magnetometer 43, located in the tool, is employed to measure the orientation of the tool with respect to the earth's magnetic field. The magnetometer is pendulum mounted to remain in a plane perpendicular to the earth's gravitational field, and is located in a portion of the tool free from magnetic effects or magnetic shielding.

Figure 4:
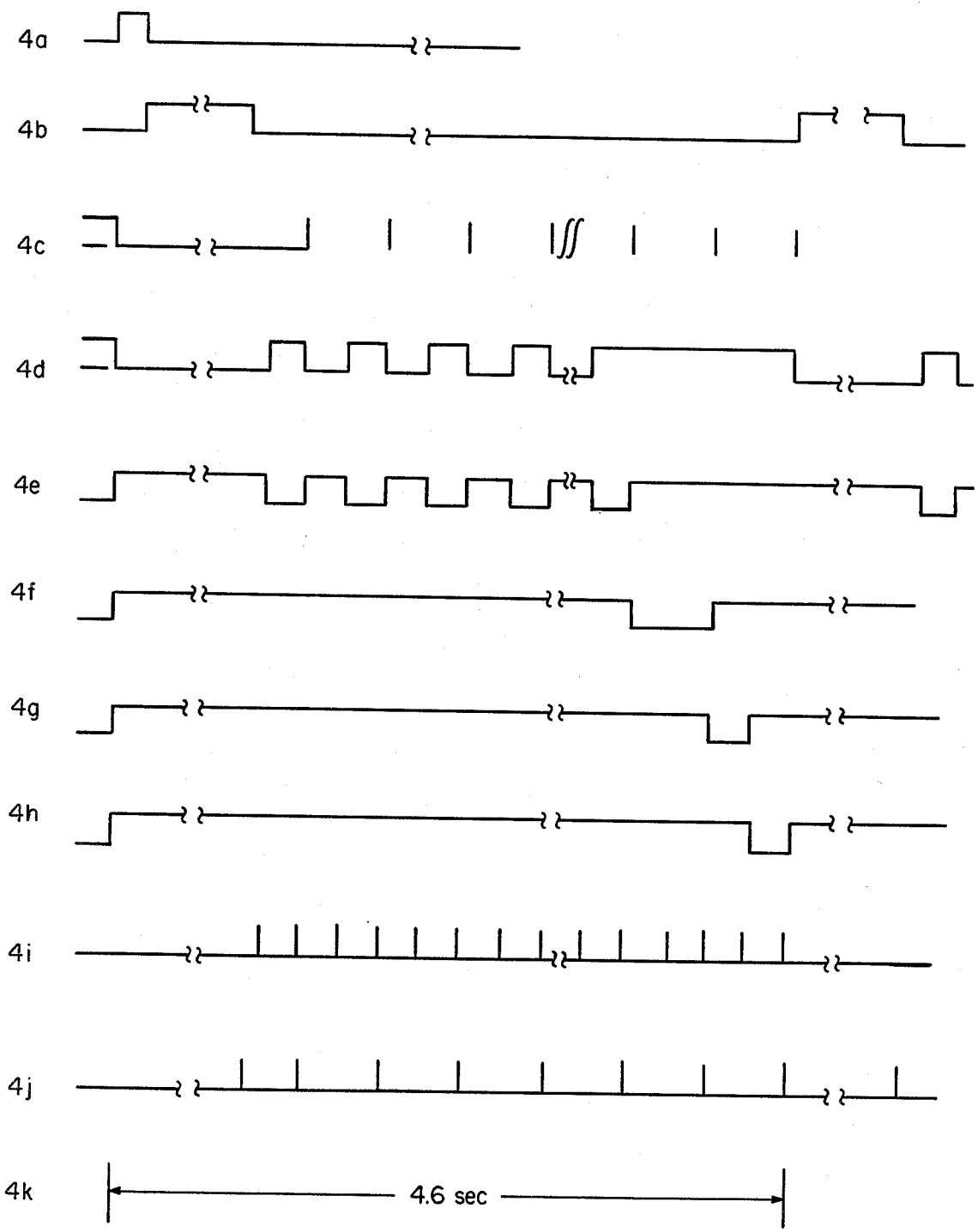
FIG. 4 is a timing diagram illustrating the sequential steps for obtaining data.

An analog to digital converter, multiplexer and line driver 42, provides a serial data communication link between the downhole unit and surface data acquisition electronics. A frame of output data is initiated by a one second frame synchronization during which time the data are transmitted. Referring to FIG. 4, the operation of the converter and multiplexer will become readily apparent. The one second frame synchronization is illustrated at FIG. 4B. Following this frame synchronizing pulse a 16 channel multiplexer provides alternatively a 2½ volt calibration pulse or one of 14 analog signals to a 12 bit analog to digital converter. The analog to digital converter signals are converted into two data bytes via six bit parallel tri-state bus drivers. The data bus is received by a UART and converted to serial data transmitted in ASCII format at a 110 baud rate.

Following the 16 channels of analog data a five bit binary status word is placed on the data bus. A sixth bit of logical 1 is added to received binary data for format reasons, and the results are placed on the data bus via the tristate bus drivers. These data are transmitted twice for redundancy. The last two data words are carriage return and line feed. The line feed signal concludes the basic frame of data, transmission time approximately 4.6 seconds including the one second frame synchronizing pulse.

A preparatory pulse illustrated by FIG. 4A is first transmitted. A frame of data is now initiated by the one second pulse generated by a one shot multivibrator as illustrated by FIG. 4B, during which time data transmission is inhibited. This one second pulse is employed to trigger the analog to digital converter 60 microsecond initiate conversion pulse illustrated at FIG. 4J, and to provide a frame synchronization pulse reset for the 16 channel control signals.

The UART date strobe, FIG. 4I, enters data into the UART input buffer when the analog to digital conversion is concluded and the UART output register is empty. The data strobe pulse rate is divided by two to produce a signal which advances a control scaler. Thus driver control signals BC1 and BC2 illustrated in FIGS. 4D and 4E are produced and place the analog to digital converter 12 bit data on the data bus lines. The most significant bite as enabled during the 4D pulse, the least significant bite during the 4E pulses. Thus the most significant bite is serially transmitted first.

After 16 channels of analog data have been scanned BC3 time illustrated at FIG. 4F is entered and the five bit binary data word is placed on the data bus. To insure that control characters are not transmitted at this time, the sixth bit is hard wired to logical 1. Thus ASCII code values of this data range from 040 through 077 in octal notation. These data are transmitted twice for redundancy. Following the time of transmittal illustrated at 4F, the ASCII values for carriage return and line feed are placed on the data bus during the times defined by FIGS. 4B and 4H respectively. An end of frame signal is produced from the FIG. 4H pulse for use by peripheral equipment.

Incoming analog information must be converted into a 0 to 10 microamp signal range analysis by the twelve bit analog to digital converter. The 16 channel analog output is first buffered by a voltage follower to provide high input impedance. Two amplifier sections are provided to perform the level conversion producing 0 to 10 microamps for the analog to digital converter. Serial data output from the unit are displayed on a standard 20 milliamp current loop teletype and or received by the computer input output interface capable of receiving serial ASCII 20 milliamp current loop data. A suitable power supply is provided, voltage levels being limited to ±7 volts to the analog section and ±7 volts to the binary data word section.

It can thus be seen that the present invention automatically measures the magnetic azimuth of vertical conductive fractures in hot dry rock. While there has been described what is at present considered to be a preferred embodiment of this invention, it will be obvious to those skilled in the art that various changes and modifications may be made therein without departing from the invention, and it is therefore intended to cover all such changes and modifications as followed in the true spirit and scope of the present invention.

What is claimed is:

1. Vertical fracture logging apparatus comprising:
    A mutually perpendicular cocentered pair of transmitting coils;
    a mutually perpendicular cocentered pair of bucking coils coplanar with said pair of transmitting coils;
    a mutually perpendicular cocentered pair of receiving coils coplanar with said pairs of transmitting and bucking coils;
    transmitting means for driving each of said transmitting coils successively with a constant level alternating current and,
    phase sensitive receiving means connected to said receiving coils.

2. In the apparatus set forth in claim 1, direction sensing means to provide a direction reference.

3. In the apparatus set forth in claim 2, converter means for converting signals from said receiving means and said directing sensing means to digital form.

4. In the apparatus set forth in claim 3, data transmission means connected to said converter means to transmit data to the surface.

5. In the apparatus set forth in claim 4, means for surrounding said coils with a non-conducting fluid.

6. In the apparatus set forth in claim 5, controller means controlling the sequence of operation.

7. Vertical fracture logging apparatus comprising:
    a first pair of rectangular, mutually perpendicular, coaxial coils for transmitting a radio frequency signal inducing eddy currents in a conductive fluid filled vertical fracture in rocks;
    a second pair of rectangular, mutually perpendicular, coaxial coils coplanar with said first pair of coils to receive signals from said induced eddy currents in said conductive fluid filled vertical fracture;
    a third pair of rectangular, mutually perpendicular, coaxial coils coplanar with said first and second pairs of coils and placed therebetween for transmitting a bucking signal in opposition with the signal from said first pair of coils for bucking out the signal from said first pair of coils induced directly in said second pair of coils,
    signal generating means connected to said first and third pairs of coils; and,
    receiving means connected to said second pair of coils.

8. In the apparatus set forth in claim 7, signal processing means in circuit with said pair of coils for transmitting received data to the surface of a borehole.

9. In the apparatus set forth in claim 8, inflatable non-conducting fluid filled means surrounding said first, second and third pairs of coils.

10. In the apparatus set forth in claim 9, sequencing means actuating said signal generating means, said receiving means, and said signal processing means.

* * * * *